United States Patent [19]

Mitchell

[11] Patent Number: 5,212,026

[45] Date of Patent: May 18, 1993

[54] CIRCULAR BATTERY FOR FLYWHEEL

[76] Inventor: Danny E. Mitchell, P.O. Box 4741 Incline Village, Incline, Nev. 89450

[21] Appl. No.: 771,680

[22] Filed: Oct. 4, 1991

[51] Int. Cl.[5] .................. H01M 2/24; H01M 2/02; B65D 85/57

[52] U.S. Cl. .................. 429/160; 429/179; 429/163; 220/507; 318/161; 322/4; 180/685

[58] Field of Search .................. 318/161; 322/4; 429/179, 98, 99, 151, 163, 149, 160, 159; 180/68.5; 220/507; 206/506

[56] References Cited

U.S. PATENT DOCUMENTS

| | | | |
|---|---|---|---|
| 3,497,026 | 2/1970 | Calvert | 322/4 X |
| 4,242,422 | 12/1980 | Lu | 429/96 X |
| 4,572,376 | 2/1986 | Wrennall | 220/507 X |

Primary Examiner—John S. Maples
Attorney, Agent, or Firm—Townsend and Townsend Khourie and Crew

[57] ABSTRACT

The present invention provides an improved battery housing which is a disk shaped cylinder. The inside of the disk is open to allow the cylindrical shaped battery to be mounted on an axle in a flywheel. The housing includes a number pie-slice shaped cells for the individual cells of the battery. A number of these battery housings can be connected together on a single axle, and electrically connected in parallel. Each housing has a negative post and a positive post extending outward which will mate with a corresponding cavity in the next cylindrical battery casing. In addition, there are a number of holes extending through each casing near the outer wall so that rods can be passed through to secure multiple battery casings together.

11 Claims, 3 Drawing Sheets

CIRCULAR BATTERY FOR FLYWHEEL

BACKGROUND OF THE INVENTION

The present invention relates to batteries, and in particular a battery for use in a flywheel.

Electrical motors are a less noisy, less polluting alternative to internal combustion engines for use in vehicles and other applications. One problem with the use of an electric motor is the need for a large amount of battery capacity, and the drag on the vehicle caused by the weight of the batteries.

One method for dealing with the weight of the battery is to put the weight of the batteries to use by mounting the batteries on a flywheel. One such system is shown in U.S. Pat. No. 3,497,026. By mounting the battery on the flywheel, the weight of the battery is used to store angular momentum in the flywheel, which can then be tapped as a source of power. This source of power can thus reduce the amount of power needed to be produced directly by the batteries, thus reducing the size of the batteries needed.

SUMMARY OF THE INVENTION

The present invention provides an improved battery housing which is a disk shaped cylinder. The inside of the disk is open to allow the cylindrical shaped battery to be mounted on an axle in a flywheel. The housing includes a number of pie-slice shaped cells for the individual cells of the battery. A number of these battery housings can be connected together on a single axle, and electrically connected in parallel. Each housing has a negative post and a positive post extending outward which will mate with a corresponding cavity in the next cylindrical battery casing. In addition, there are a number of holes extending through each casing near the outer wall so that rods can be passed through to secure multiple battery casings together.

Each casing preferably has a number of grooves in the outer edge for the placement of balancing weights. These weights can be applied in much the same manner as weights are applied to the rim of an automobile wheel. The weights balance the flywheel arrangement to compensate for any variations in the weight distribution of the individual batteries. The groove is wider at the bottom and narrow at the top to form a self-securing function for a weight, which can slide in and be secured with a set screw.

The batteries are preferably made with a gel-type lead acid core. The seal cap for each cell is located near the center of the cylindrical casing. In this way, the off-gas will be located near the center, maximizing the weight distribution near the outer edges of the casing and allowing the gel to be evenly distributed through centrifugal action.

The present invention thus provides an efficient battery structure for use in a flywheel which makes maximum use of the available space and provides a configuration which is stable and aerodynamic.

The connections to the battery of the present invention are preferably made on each end of the axle through the series of battery casings, with one end being used for positive and the other for negative. This connection is made through a transmission engagement mechanism on the ends thereof.

For a fuller understanding of the nature and advantages of the invention, reference should be made to the ensuing detailed description taken in conjunction with the accompanied drawings.

DESCRIPTION OF THE PREFERRED EMBODIMENT

Figure 1A:
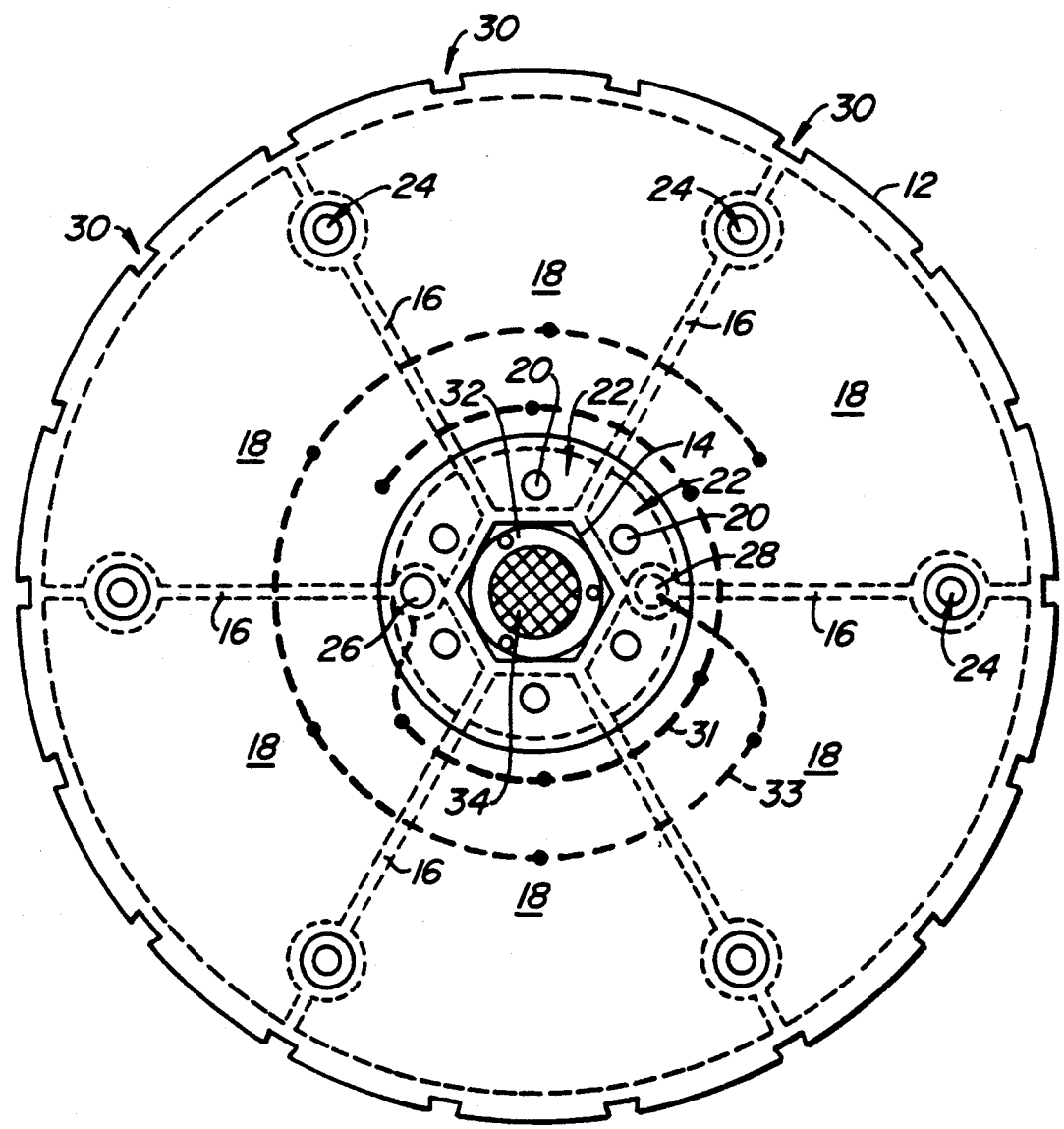
FIG. 1A is a side cutaway view of a preferred embodiment of a battery casing according to the present invention.
Figure 1B:
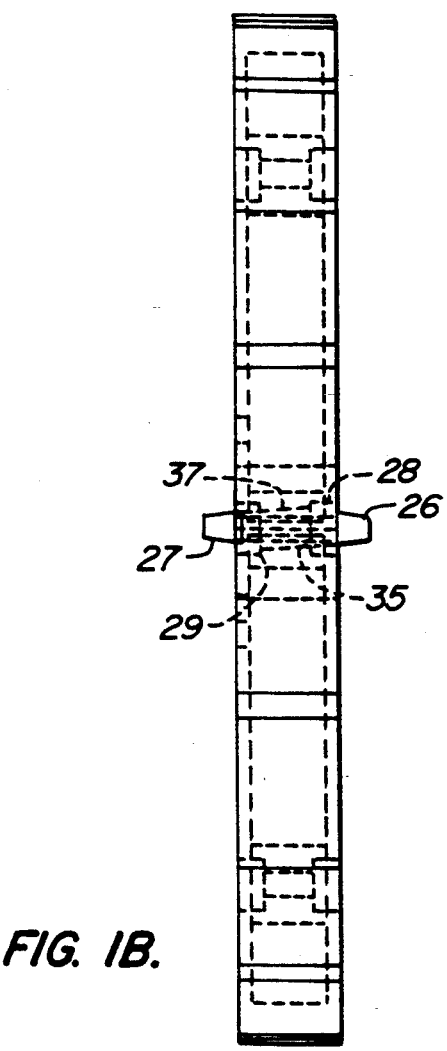
FIG. 1B is a side view of the casing in FIG. 1A.

FIG. 1A is a cross-sectional view of the preferred embodiment of a battery housing according to the present invention. FIG. 1B is a side view of the embodiment of FIG. 1A. The housing has an outer, cylindrical wall 12 and an inner, hexagonal wall 14. A number of interior walls 16 divide the housing into six pie-slice shaped cells 18. The walls are preferably made of a strong, but lightweight material, such as polyethylene plastic. The battery cells are preferably a gel type lead acid core which are filled through holes near the center covered by seal caps 20. The filling process will typically leave a void area for the off gas from the acid, as indicated by dotted lines in area 22.

Figure 2:
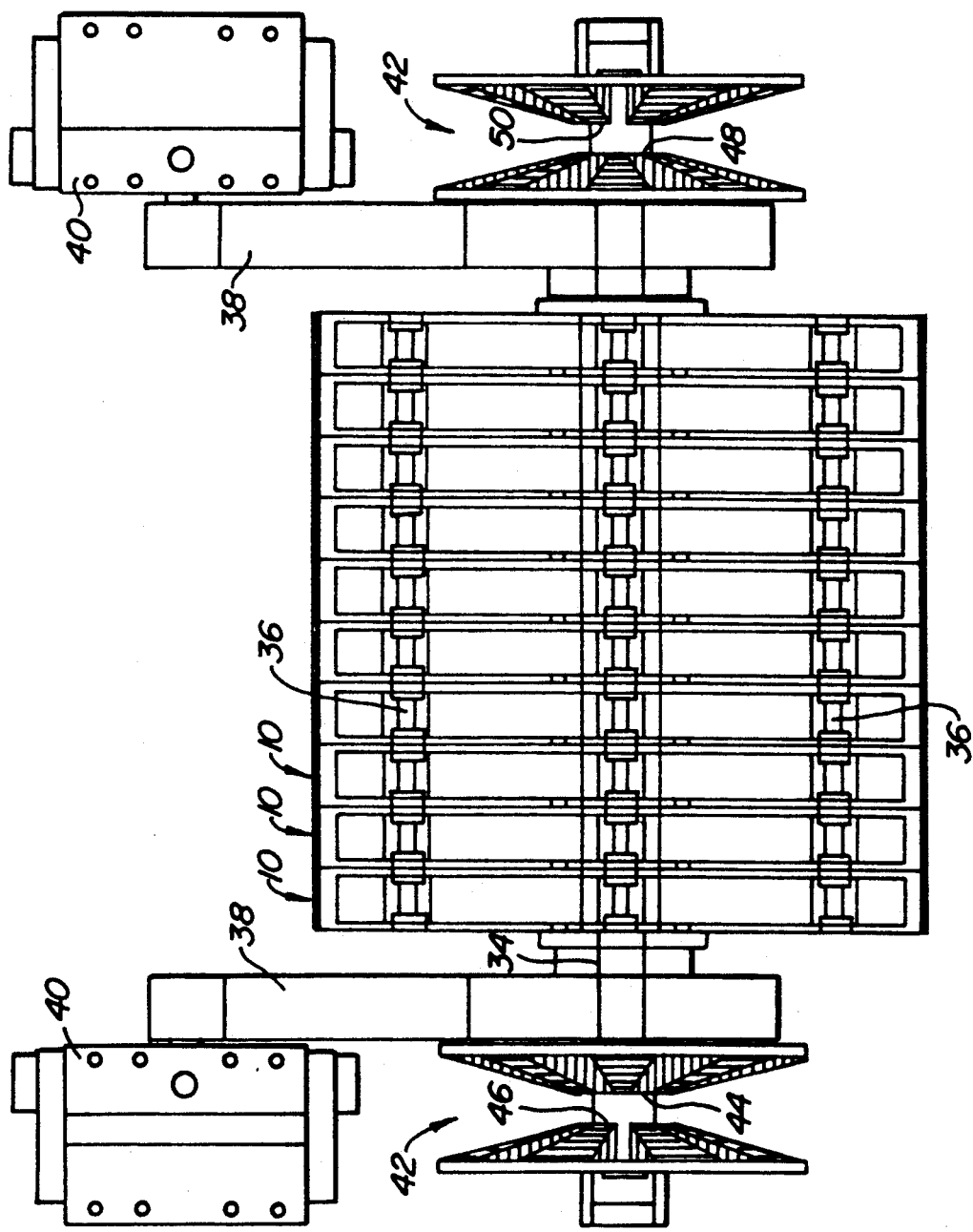
FIG. 2 is a diagram illustrating a number of battery housings connected together on a flywheel.

Each interior wall 16 has a opening 24. These openings are used to pass through a rod for securing multiple battery housings together as shown in FIG. 2. Near the center of the housing is a positive terminal post 26 and a negative terminal cavity 28. On the opposite side of the housing are a corresponding positive cavity and negative post 27. Each of these is electrically connected (31,33) in series with the positive and negative ends, respectively, of the individual battery cells. An electrical connection 37 connects negative post 27 to negative terminal cavity 28. An electrical connection 35 connects positive terminal post 26 to positive cavity 29. The post will mate with the cavity 29 on an adjacent battery housing to form a connection through a series of housing as shown in FIG. 2. The side view of FIG. 1B shows positive terminal 26 extending outward.

The outside of outer wall 12 includes a number of grooves 30. These grooves are used for inserting weights to balance the battery housing when it is mounted on a flywheel. The groove is narrower at the outside than the inside, thus providing a retaining mechanism for a complementary shaped weight which can be slid into a groove and anchored with a set screw. The set screw, when screwed in, will force the weight up towards the narrow, outer edge of the groove, wedging it in place. The weights can be applied in much the same manner that weights are applied to the hub of a wheel on a car for balancing the wheel.

Inside the interior, hexagon shaped wall 14 is a annular ring 32 for connecting to an axle 34. Axle 34 will extend through a series of battery housings as shown in FIG. 2.

FIG. 2 shows a number of housings 10 mounted on an axle 34. Also shown in the cutaway view are a pair of the rods 36 which extend through holes 24 to secure the housings together.

In the flywheel system of FIG. 2, the axle is rotated to start movement through a pair of belts 38 connected to motor 40. Once the flywheel has begun spinning, its angular momentum is tapped by connected it through transmission 42 on either side. The electrical connection is made to the center of a transmission with the left side providing a negative terminal 44 connecting to the other side of the middle of transmission 46 to provide an electrical connection from the battery to the electrical motors. The connection to center portion 44 along axle 34 is provided by a strap connected from the negative terminal along the axle. Similarly, electrical connection is made between center portion 48 and portion 50 of the corresponding side of a right side transmission.

Figure 3:
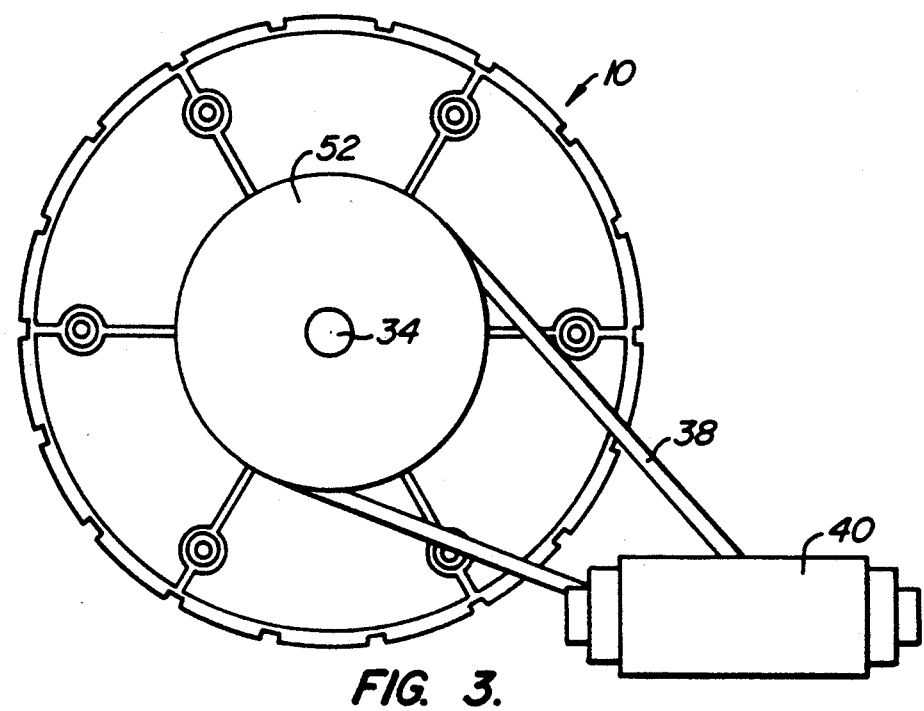
FIG. 3 is a side view of the timing belt connection to the flywheel of FIG. 2.

FIG. 3 shows a side view isolating motor 40 and belt 38 connected to a pulley 52 connected to axle 34 for turning the flywheel arrangement including the battery housings 10.

As will be understood by those familiar with the art, the present invention may be embodied in other specific forms without departing from the spirit or essential characteristics thereof. For example, the multiple battery housings could have their batteries connected in either series or parallel. Accordingly, the disclosure of the preferred embodiment of the invention is intended to be illustrative, but not limiting, of the scope of the invention which is set forth in the following claims.

What is claimed is:

1. A battery housing for use in a flywheel, comprising:
   a cylindrical casing having a cylindrical outer wall and an inner wall with an opening for attachment to an axle; and
   a plurality of interior walls defining a plurality of pie-slice shaped inner cells containing a plurality of pie-slice shaped cells of a battery.

2. The battery housing of claim 1 further comprising:
   a positive post, extending axially from a first side of said casing proximate said inner wall;
   means for connecting a positive side of each of said cells in series to said positive post;
   a positive cavity opposite said positive post on a second side of said casing for mating with a positive post of another battery housing, said positive casing being electrically connected to said positive post;
   a negative post, extending axially from said second side of said casing proximate said inner wall;
   means for connecting a negative side of each of said cells in series to said negative post; and
   a negative cavity opposite said negative post on said first side of said casing for mating with a negative post of another battery housing, said negative casing being electrically connected to said negative post.

3. The battery housing of claim 1 further comprising:
   a plurality of holes extending axially through each of said interior walls proximate said outer wall for allowing the passage of rods to secure a plurality of said battery housings together.

4. The battery housing of claim 1 further comprising:
   a plurality of outward facing grooves in said cylindrical outer wall shaped to secure balancing weights.

5. The battery housing of claim 4 wherein said grooves are wider at their bottoms than they are at their tops.

6. A battery flywheel system comprising:
   a plurality of battery housings, each housing having a cylindrical casing having a cylindrical outer wall, an inner wall, an axial opening and a plurality of interior walls defining a plurality of pie-slice shaped inner cells for containing a plurality of cells of the battery;
   a plurality of holes extending axially through each of said interior walls of each of said battery housings proximate said outer wall;
   a plurality of rods extending through said holes to secure said plurality of said battery housings together; and
   an axle extending through said axial opening and secured to said battery housings.

7. The battery flywheel system of claim 6 wherein each of said battery housings further comprises:
   a positive post, extending axially from a first side of said casing proximate said inner wall;
   means for connecting a positive side of each of said cells in series to said positive post;
   a positive cavity opposite said positive post on a second side of said casing for mating with a positive post of another battery housing, said positive casing being electrically connected to said positive post;
   a negative post, extending axially from said second side of said casing proximate said inner wall;
   means for connecting a negative side of each of said cells in series to said negative post; and
   a negative cavity opposite said negative post on said first side of said casing for mating with a negative post of another battery housing, said negative casing being electrically connected to said negative post.

8. The battery flywheel system of claim 6 wherein each of said battery housings further comprises:
   a plurality of outward facing grooves in said cylindrical outer wall for accepting balancing weights, said grooves being aligned with each other from one battery housing to the next battery housing.

9. A battery housing for use in a flywheel, comprising:
   a cylindrical casing having a cylindrical outer wall and an inner wall with an opening for attachment to an axle;
   a plurality of interior walls defining a plurality of pie-slice shaped inner cells for containing the cells of the battery;
   a positive post, extending axially from a first side of said casing proximate said inner wall;
   means for connecting a positive side of each of said cells in series to said positive post;
   a positive cavity opposite said positive post on a second side of said casing for mating with a positive post of another battery housing, said positive casing being electrically connected to said positive post;
   a negative post, extending axially from said second side of said casing proximate said inner wall;
   means for connecting a negative side of each of said cells in series to said negative post;
   a negative cavity opposite said negative post on said first side of said casing for mating with a negative post of another battery housing, said negative casing being electrically connected to said negative post;
   a plurality of holes extending axially through each of said interior walls proximate said outer wall for allowing the passage of rods to secure a plurality of said battery housings together; and
   a plurality of outward facing grooves in said cylindrical outer wall for accepting balancing weights.

10. A battery housing for use in a flywheel, comprising:
- a cylindrical casing having a cylindrical outer wall and an inner wall with an opening for attachment to an axle;
- a plurality of interior walls defining a plurality of pie-slice shaped inner cells for containing a plurality of cells of the battery;
- a positive post, extending axially from a first side of said casing proximate said inner wall;
- means for connecting a positive side of each of said cells in series to said positive post;
- a positive cavity opposite said positive post on a second side of said casing for mating with a positive post of another battery housing, said positive casing being electrically connected to said positive post;
- a negative post, extending axially from said second side of said casing proximate said inner wall;
- means for connecting a negative side of each of said cells in series to said negative post; and
- a negative cavity opposite said negative post on said first side of said casing for mating with a negative post of another battery housing, said negative casing being electrically connected to said negative post.

11. A battery housing for use in a flywheel, comprising:
- a cylindrical casing having a cylindrical outer wall and an inner wall with an opening for attachment to an axle;
- a plurality of interior walls defining a plurality of pie-slice shaped inner cells for containing a plurality of cells of the battery; and
- a plurality of holes extending axially through each of said interior walls proximate said outer wall for allowing the passage of rods to secure a plurality of said battery housings together.

* * * * *